(12) United States Patent
Shih

(10) Patent No.: US 8,104,806 B1
(45) Date of Patent: Jan. 31, 2012

(54) EASY OPERATED PICK UP TOOL

(76) Inventor: Leo Shih, Taichung (TW)

( * ) Notice: Subject to any disclaimer, the term of this patent is extended or adjusted under 35 U.S.C. 154(b) by 0 days.

(21) Appl. No.: 13/014,707

(22) Filed: Jan. 26, 2011

(51) Int. Cl.
*B25J 1/02* (2006.01)

(52) U.S. Cl. ......... 294/24; 294/65.5; 294/100; 294/120

(58) Field of Classification Search .............. 294/24, 294/65.5, 182, 66.2, 100, 99.2; 362/119, 362/120
See application file for complete search history.

(56) References Cited

U.S. PATENT DOCUMENTS

| | | | | |
|---|---|---|---|---|
| 2,594,908 | A * | 4/1952 | Gaulke et al. | 294/86.14 |
| 5,615,920 | A * | 4/1997 | O'Kane et al. | 294/65.5 |
| 5,647,623 | A * | 7/1997 | Shiao | 294/65.5 |
| 5,826,928 | A * | 10/1998 | Shang | 294/24 |
| 6,283,607 | B1 * | 9/2001 | Lin | 362/119 |
| 6,315,340 | B1 * | 11/2001 | Chen | 294/24 |
| 6,478,442 | B2 * | 11/2002 | Chen | 362/119 |
| 7,278,751 | B2 * | 10/2007 | Chang et al. | 362/120 |
| 7,510,295 | B2 * | 3/2009 | Shih | 362/119 |
| 7,527,311 | B2 * | 5/2009 | Shih | 294/100 |

* cited by examiner

*Primary Examiner* — Paul T Chin

(74) *Attorney, Agent, or Firm* — Raymond Y. Chan; David and Raymond Patent Firm

(57) ABSTRACT

An easy operated pick up tool comprises a body which includes a first tube member, an extending tube, and a second tube member; an actuating post fitted into the first tube member, between the actuating post and the first tube member being defined a first resilient element, wherein the actuating post including a holder and a string inserted into a front end of the second tube member to connect with an expandable paw; a cell set received in the holder; a bulb disposed in the second tube member and including a first leg connected with a first electrode of the cell set; a controlling assembly including a receiving cylinder screwed with the holder to receive a stem for pushing an electricity conducting shaft which contacts with a second electrode of the cell set; a magnetic attracting member having an insulation sleeve fitted on the body and including a magnet loop.

10 Claims, 12 Drawing Sheets

EASY OPERATED PICK UP TOOL

BACKGROUND OF THE PRESENT INVENTION

1. Field of Invention

The present invention relates to a pick up tool that when the magnetic attracting member is movably fixed on the first tube member, the paw is capable of picking up an object, and when the magnetic attracting member is movably fixed on the second tube member, the magnet loop allows to attract the object.

2. Description of Related Arts

As shown in FIGS. 1 and 2, an illuminable picker 10 disclosed in U.S. Pat. No. 7,527,311 comprises a first tube member 11 having a flexible extending tube 12 disposed on a front end thereof, and a front end of the extending tube 12 is coupled with a second tube member 13. The first tube member 11 includes a post 14 fitted on a rear end thereof, wherein the post 14 includes a string 141 fixed on a front end thereof and inserted through the first tube member 11, the extending tube 12, and the second tube member 13. A front end of the string 141 is connected with an expandable paw 143 by using a limiting block 142, and a resilient element 144 is provided to push against the post 14 to return back to an original position so that the paw 143 is elastically retracted in a front end of the second tube member 13. Besides, the post 14 includes a cell set 15 received in a rear end thereof, a first electrode of the cell set 15 connecting with a first leg of a bulb 16 which is received in the second tube member 13 by using a conductive wire 151, and a second leg of the bulb 16 electrically couples with the second tube member 13. The post 14 includes a receiving cylinder 17 screwed on the rear end thereof to receive a controlling member 171 with a conducting shaft 172. The controlling member 171 is capable of being pressed so that the conducting shaft 172 contacts with a second electrode of the cell set 15, hence the cell set 15 and the bulb 16 conduct with each other to turn on the bulb 16 via the conductive wire 151, the conducting shaft 172 of the controlling member 171, the receiving cylinder 17, the post 14, the first tube member 11, the extending tube 12, and the second tube member. When a circuit is conducted between the cell set 15 and the bulb 16 to tune on the bulb 16, the object is viewed clearly. Thereafter, the controlling member 171 is pressed continuously to actuate the post 14 to compress the resilient element 144 to move frontward, and the string 141 and the paw 143 are actuated to move frontward so that the paw 143 extends out of the second tube member 13 to expand outward, thus illuminates the object. However, when the paw 143 is served to pick up the object, if the object is in a small or a large size, the paw 143 can not pick up the object securely.

To solve above-mentioned defects, a pick up tool 20 is disclosed in TW Pat. No. M358036 as shown in FIG. 3 and includes a first tube member 21, a flexible extending tube 22 connected with a front end of the first tube member 21, and a second tube member 23 coupled with a front end of the extending tube 22, wherein the second tube member 23 includes a cover member 231 fixed on a front end thereof to cover a magnet head 232. The first tube member 21 includes a stem 24 with a resilient element 241 fitted on a rear end thereof, and the stem 24 includes a disc 242 secured on a rear end thereof and a string 243 arranged on a front end thereof and inserted through the first tube member 21, the extending tube 22, and the second tube member 23; a front end of the string 243 is connected with an expandable paw 245 by ways of a limiting member 244 so that the paw 245 is located at the front end of the second tube member 23. When the pick up tool is not operated, the stem 24 is pushed by the resilient element 241 to actuate the string 243 and the paw 245 to move backward so that the paw 245 is guided and pressed by the second tube member 23 to be further retracted in the front end of the second tube member 22. Referring to FIG. 4, when the pick up tool 20 is used to puck up an object in a narrow space, the second tube member 23 is put into the space so that the paw 245 is moved toward the object, and the disc 242 of the stem 24 is pressed so that the paw 245 extends out of the second tube member 23 to pick up the object, or the object is attracted by the magnet head 232 of the second tube member 23. Nevertheless, the magnet head 232 is fixed on the second tube member 23, so when the second tube member 23 is inserted into the space, and other magnetic articles are located in the space, the magnet head 232 of the second tube 23 will attract these magnetic articles in advance without attracting the object further. As illustrated in FIG. 5, the cover member 231a is large enough to insolate the magnetic force of the magnet head 232. But a size of a head end of the second tube member 23 is increased without inserting the second tube member 23 into the space. Furthermore, the cover member 231a will shield the object without being seen clearly. Since the pick up tool 20 is not provided with an illuminating component, when it is used to pick up the object in a dim space, the object can not be viewed.

The present invention has arisen to mitigate and/or obviate the afore-described disadvantages.

SUMMARY OF THE PRESENT INVENTION

The primary object of the present invention is to provide an easy operated pick up tool that when the magnetic attracting member is movably fixed on the first tube member, the paw is capable of picking up an object, and when the magnetic attracting member is movably fixed on the second tube member, the magnet loop allows to attract the object.

Further object of the present invention is to provide an easy operated pick up tool that includes a magnetic attracting member with a magnet loop disposed on the first tube member, the extending tube, and the second tube member so that when the paw is used to pick up the object, the magnetic attracting member is moved to position on the first tube member so that the second tube member is inserted into a narrow space to pick up the object exactly and easily.

Another object of the present invention is to provide an easy operated pick up tool that includes a bulb fixed in the second tube member to connect with the cell set electrically so that the bulb is turned on to illuminate the object by ways of the controlling assembly as picking up the object by using the paw or the magnet loop.

In accordance with the present invention, there is provided an easy operated pick up tool contains:

a body having a first tube member, an extending tube, and a second tube member, wherein a front end of the first tube member being connected with the extending tube, and a front end of the extending tube being coupled with the second tube member;

an actuating post fitted into the rear end of the first tube member, between the actuating post and the first tube member being defined a first resilient element, and the actuating post having a holder arranged on a rear end thereof and a string secured on a front end thereof and inserted into the first tube member, the extending tube, and the second tube member, the string being inserted into a front end of the second tube member to connect with an expandable paw;

a cell set received in the holder of the actuating post;

a bulb disposed in the second tube member of the body and having a first leg connected with a first electrode of the cell set by ways of a conductive wire;

a controlling assembly having a receiving cylinder screwed with a rear end of the holder to receive a stem, the stem being actuated to push an electricity conducting shaft which contacts with a second electrode of the cell set so that the second electrode of the cell set contacts with a second leg of the bulb;

a magnetic attracting member having an insulation sleeve fitted on the body and moving frontward and backward along the body, wherein the insulation sleeve having a magnet loop fixed on a front end thereof.

The present invention will become more obvious from the following description when taken in connection with the accompanying drawings, which show, for purpose of illustrations only, the preferred embodiment in accordance with the present invention.

DETAILED DESCRIPTION OF THE PREFERRED EMBODIMENT

Figure 1:
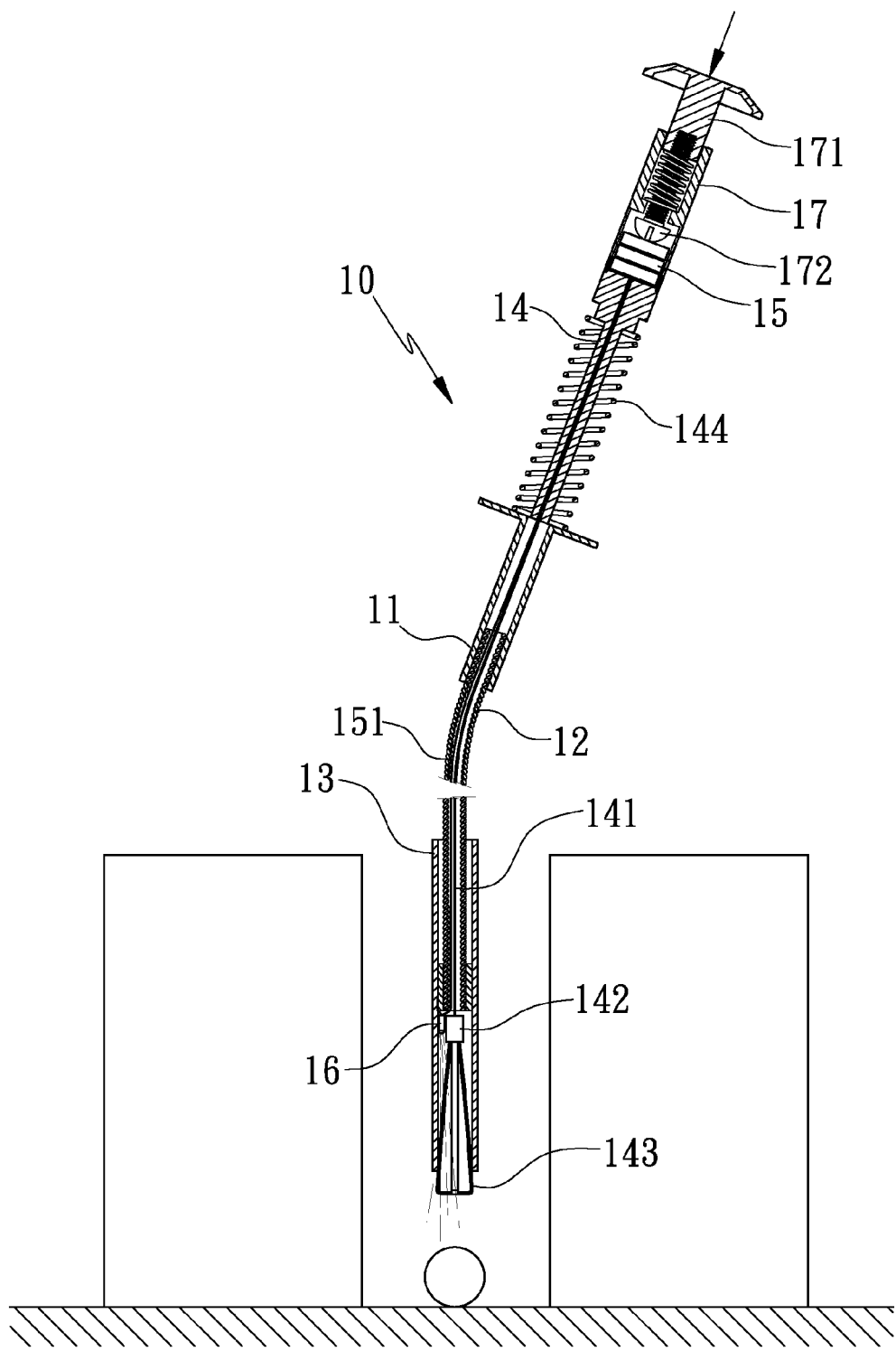
FIG. 1 is a cross sectional view showing the operation of a conventional illuminable picker of U.S. Pat. No. 7,527,311.
Figure 2:
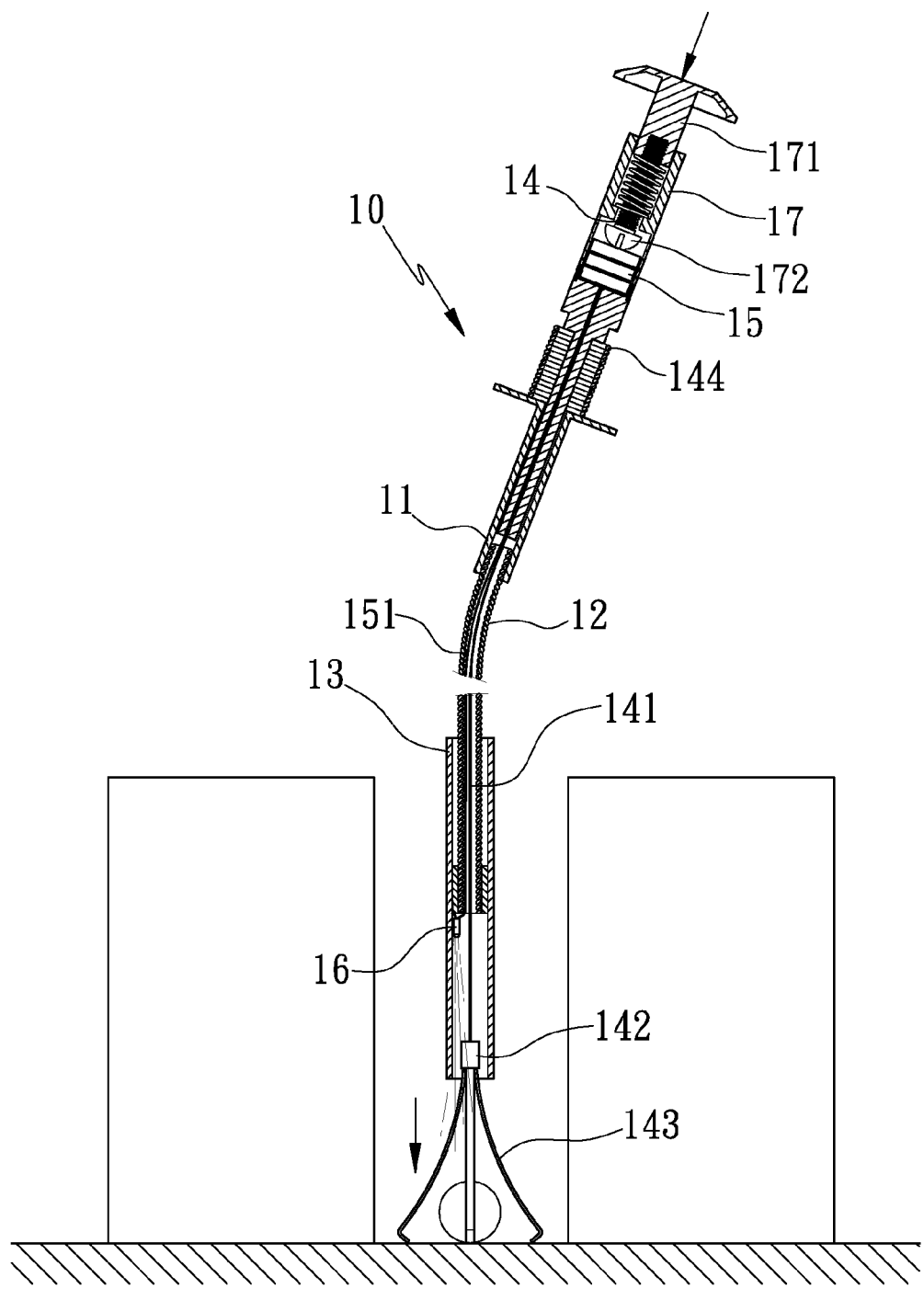
FIG. 2 is a cross sectional view showing the operation of the conventional illuminable picker of U.S. Pat. No. 7,527,311.
Figure 3:
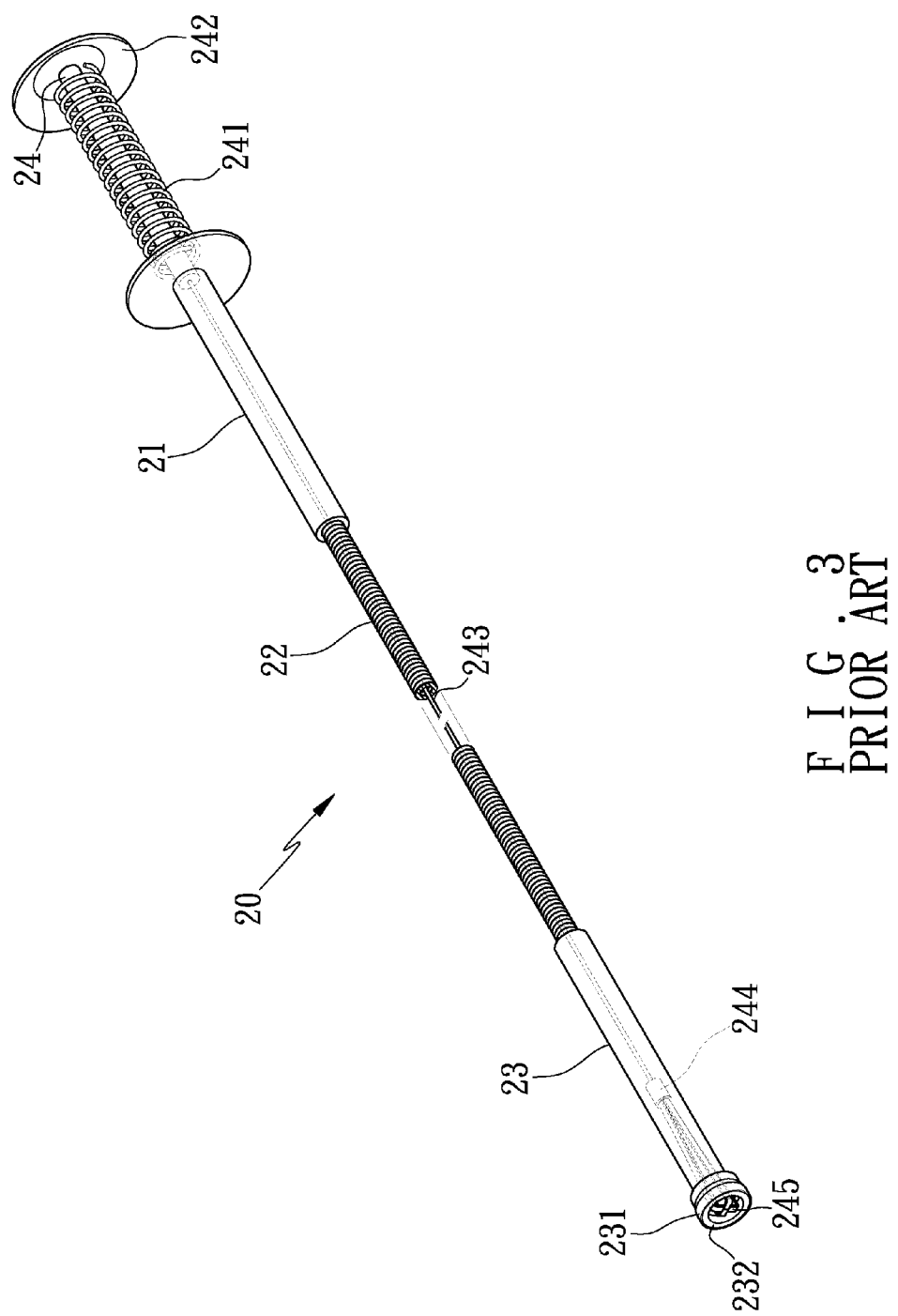
FIG. 3 is a perspective view showing the assembly of a conventional pick up tool of TW Pat. No. M 358036.
Figure 4:
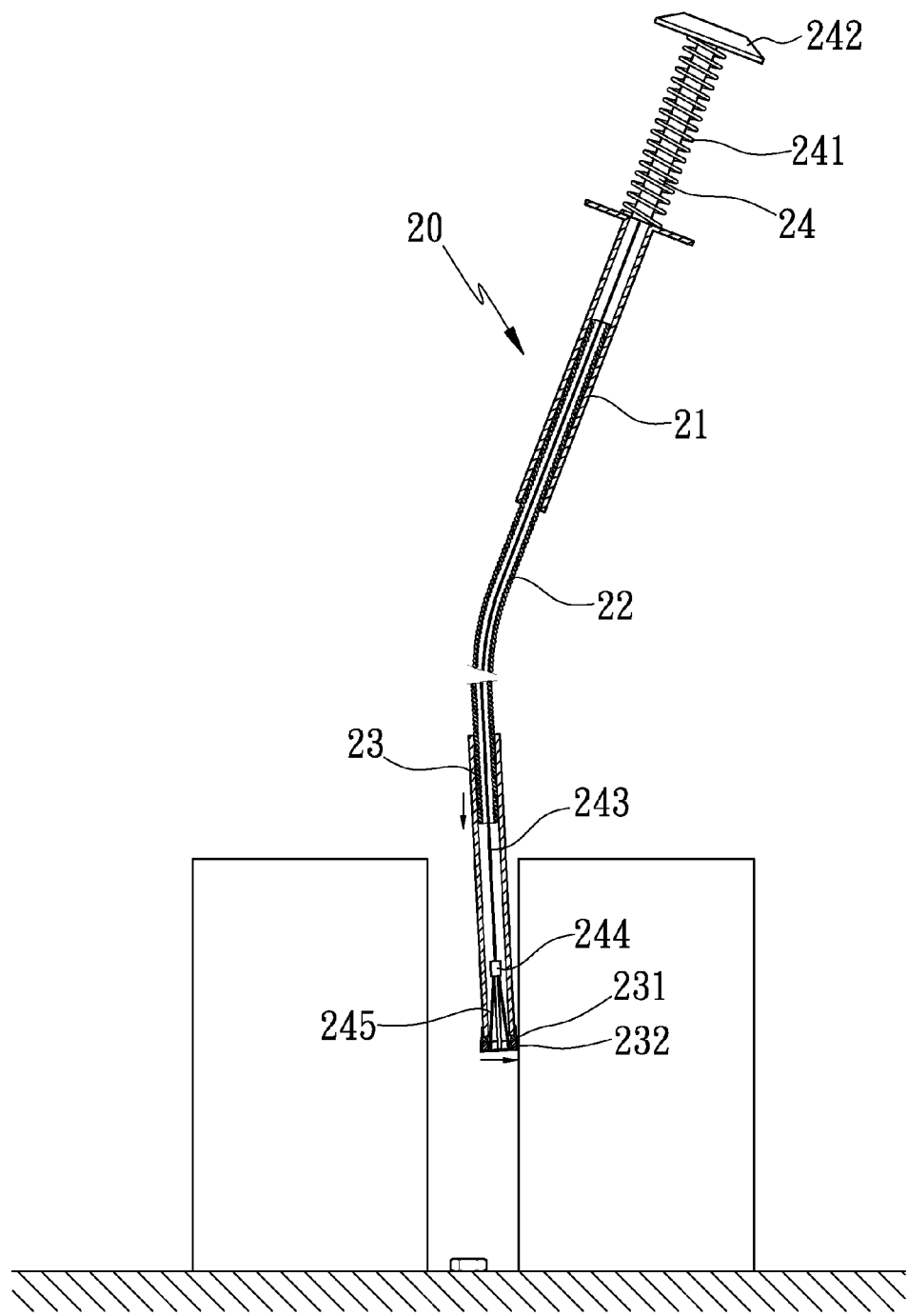
FIG. 4 is a cross sectional view showing the operation of the conventional pick up tool of TW Pat. No. M 358036.
Figure 5:
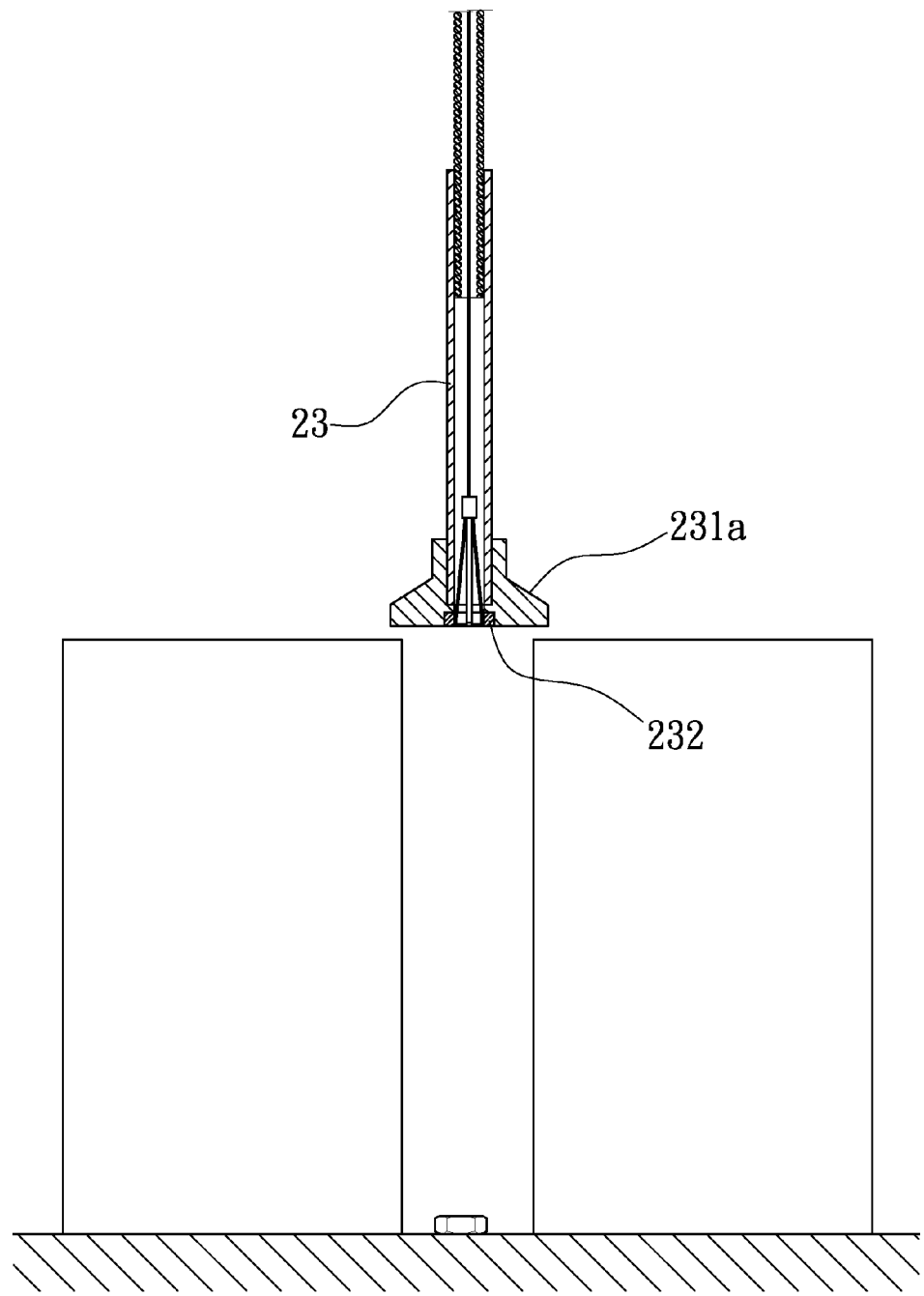
FIG. 5 is a cross sectional view showing the conventional pick up tool of TW Pat. No. M 358036 is provided with a cover member.
Figure 6:
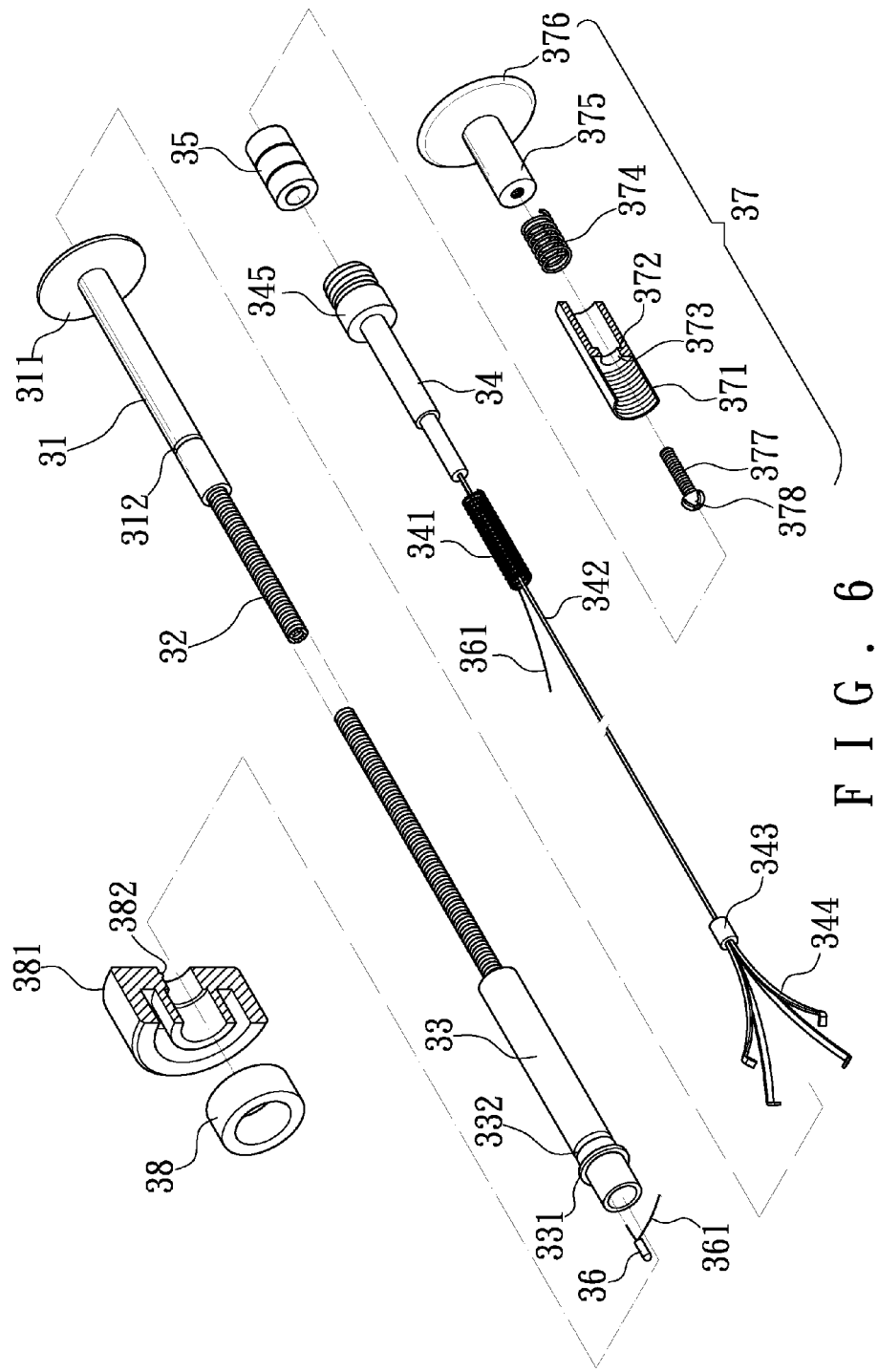
FIG. 6 is a perspective view showing the exploded components of an easy operated pick up tool according to a preferred embodiment of the present invention.
Figure 7:
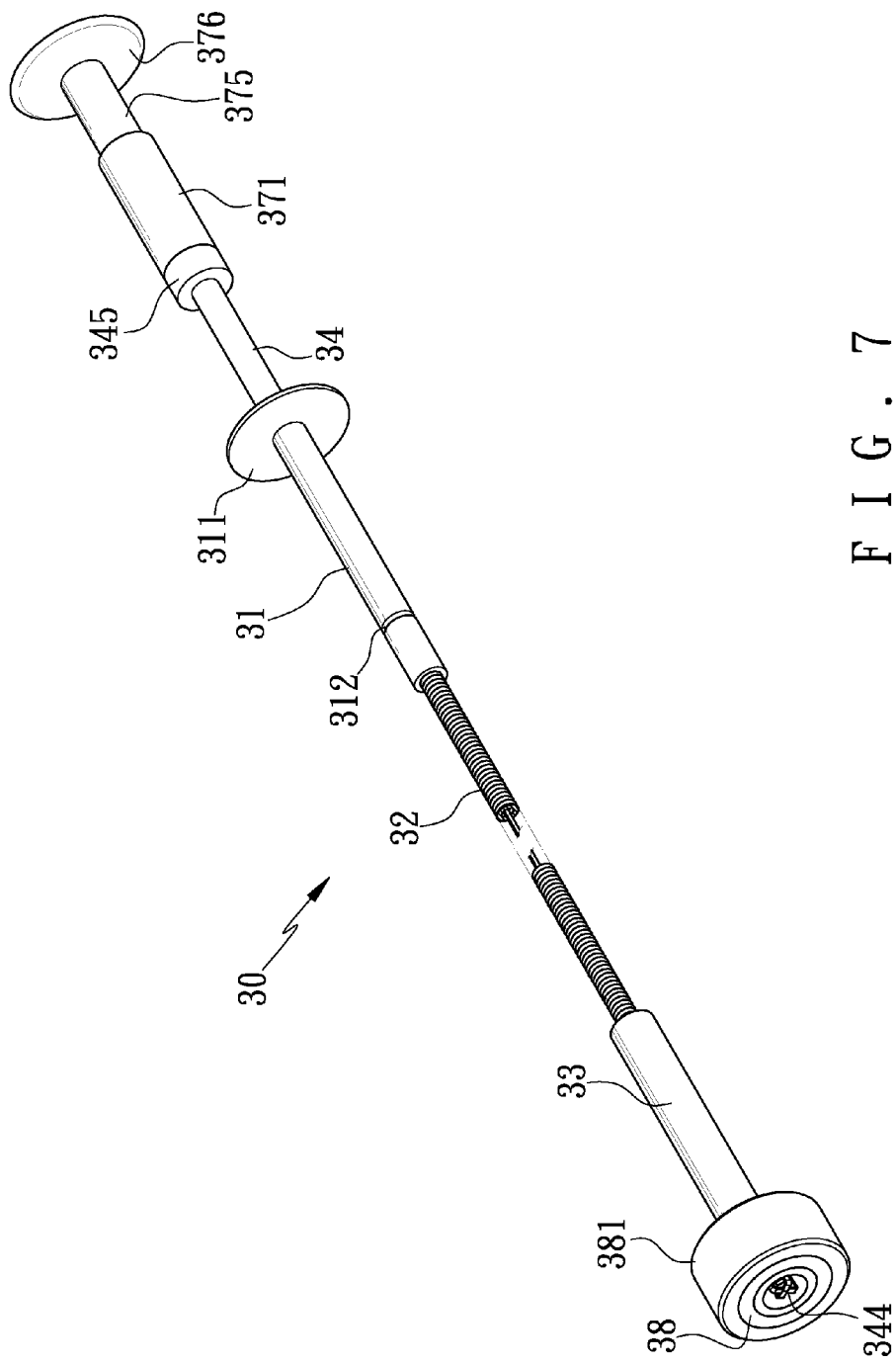
FIG. 7 is a perspective view showing the assembly of the easy operated pick up tool according to the preferred embodiment of the present invention.
Figure 8:
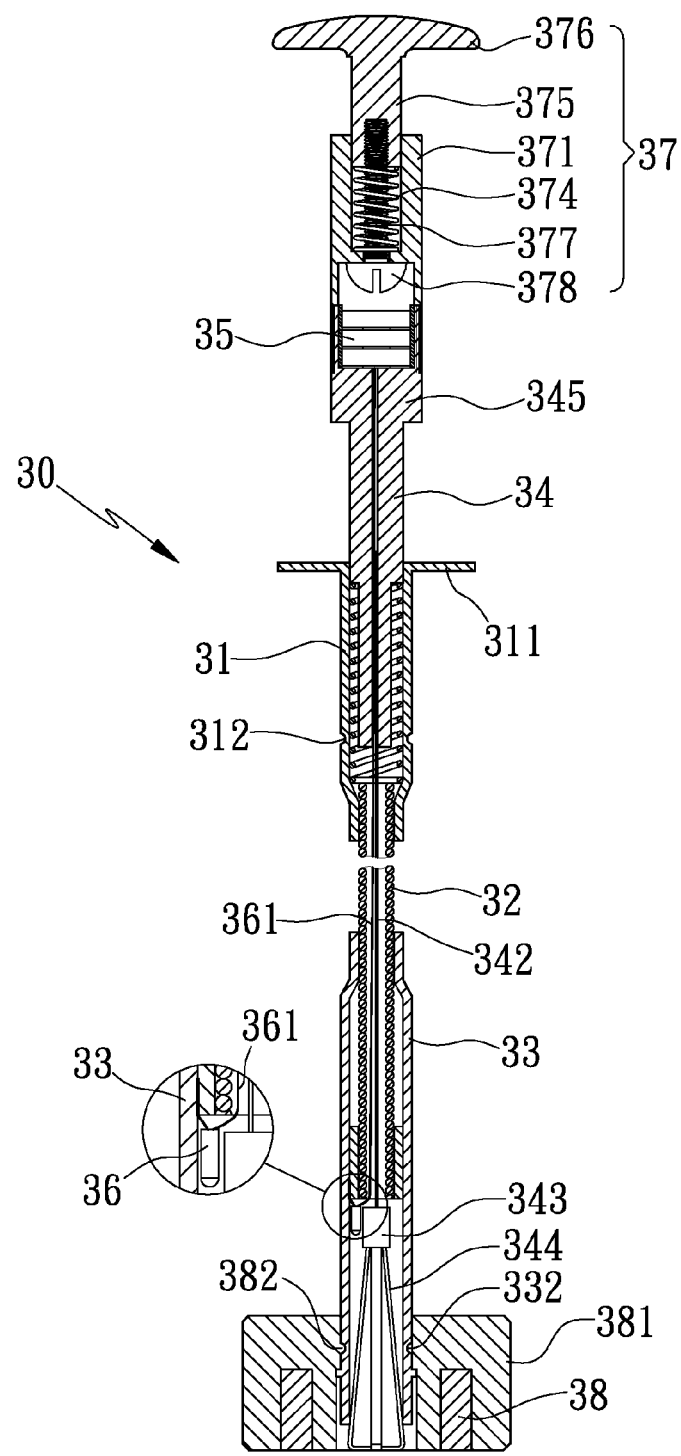
FIG. 8 is a cross sectional view showing the assembly of the easy operated pick up tool according to the preferred embodiment of the present invention.

Referring to FIGS. 6-8, an easy operated pick up tool 30 in accordance with a preferred embodiment of the present invention comprises a body including a first tube member 31, a flexible extending tube 32, and a second tube member 33, an actuating post 34, a cell set 35, a bulb 36, a controlling assembly 37, and a magnetic attracting member 38.

The first tube member 31 includes a disc 311 disposed on a rear end thereof and a front end which is connected with the extending tube 32. The front end of the extending tube 32 is coupled with the second tube member 33. The first tube member 31 also includes the actuating post 34 fitted into the rear end thereof, and between the actuating post 34 and the first tube member 31 is defined a first resilient element 341 to push the actuating post 34 to move in the rear end of the first tube member 31. The actuating post 34 includes a string 342 secured on a front end thereof and inserted into the first tube member 31, the extending tube 32 and the second tube member 33. In this embodiment, the string 342 is made of a flexible steel material. The string 342 is further inserted into a front end of the second tube member 33 to connect with an expandable paw 344 by using a limiting ring 343 which is positioned at the front end of the second tube member 33. The paw 344 includes four elastically expabeable L-shaped steel pieces, and the actuating post 34 includes a holder 345 arranged on a rear end thereof to receive the cell set 35. The second tube member 33 includes the bulb 36 disposed therein, and a first leg of the bulb 36 is coupled with the holder 354 by ways of a conductive wire 361 so as to further connects with a first electrode of the cell set 35, and a second leg of the bulb 36 contacts with an inner surface of the second tube member 33, on a rear end of the holder 354 is fixed the controlling assembly 37 to turn on/off the bulb 36. The controlling assembly 37 includes a receiving cylinder 371 screwed with the rear end of the holder 345, and the receiving cylinder 371 includes a shoulder 372 with a hole 373 arranged therein. The shoulder 372 includes a second resilient member 374, a stem 375 and a circular tab 376 both of which are connected together. The shoulder 372 includes an electricity conducting shaft 377 attached on a front end thereof, and the electricity conducting shaft 377 includes an abutting portion 378 secured on a front end thereof and a rear end inserted into the hole 373 of the shoulder 372 to screw with the stem 375, such that when the tab 376 is pressed, the stem 375 is actuated to push the abutting portion 378 of the electricity conducting shaft 377 to contact with a second electrode of the cell set 35 so that the cell set 35 conducts with the bulb 36 electrically, thus turns on the bulb 36. The magnetic attracting member 38 includes an insulation sleeve 381 fitted on the second tube member 33 and moving frontward and backward along the first tube member 31, the extending tube 32 and the second tube member 33, wherein the second tube member 33 includes a stop rib 331 formed on an outer surface thereof to limit the insulation sleeve 381. The insulation sleeve 381 includes a groove 382 formed on a front end thereof to receive a magnet loop 383, and among the insulation sleeve 381. The first and the second tube members 31, 33 are defined a positioning structure so that the magnetic attracting member 38 is movably fixed on the first tube member 31, such that the paw 344 is capable of picking up an object. In addition, the magnetic attracting member 38 is also movably fixed on the second tube member 33 so that the magnet loop 383 attracts the object. The positioning structure includes a locking block 384 disposed on an inner surface of the magnet member 38, a first slot 312 fixed around an outer surface of the first tube member 31 to retain with the locking block 384 of the magnetic attracting member 38 and a second slot 332 formed around the outer surface of the second tube member 33 to retain with the locking block 384 so that the magnetic member 33 is moved to be positioned on the first tube member 31 or the second tube member 33 further.

Figure 9:
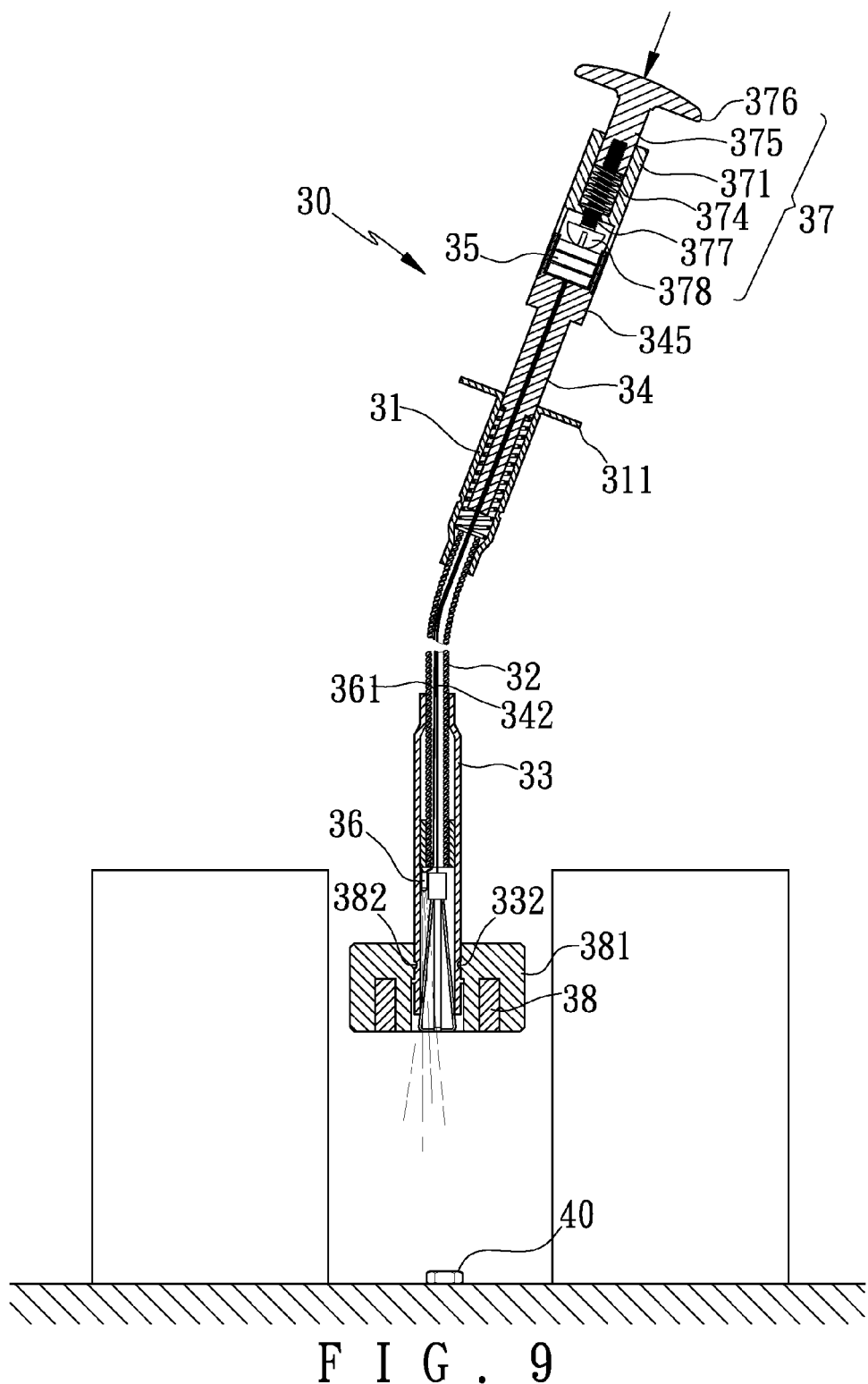
FIG. 9 is a cross sectional view showing the operation of the easy operated pick up tool according to the preferred embodiment of the present invention.
Figure 10:
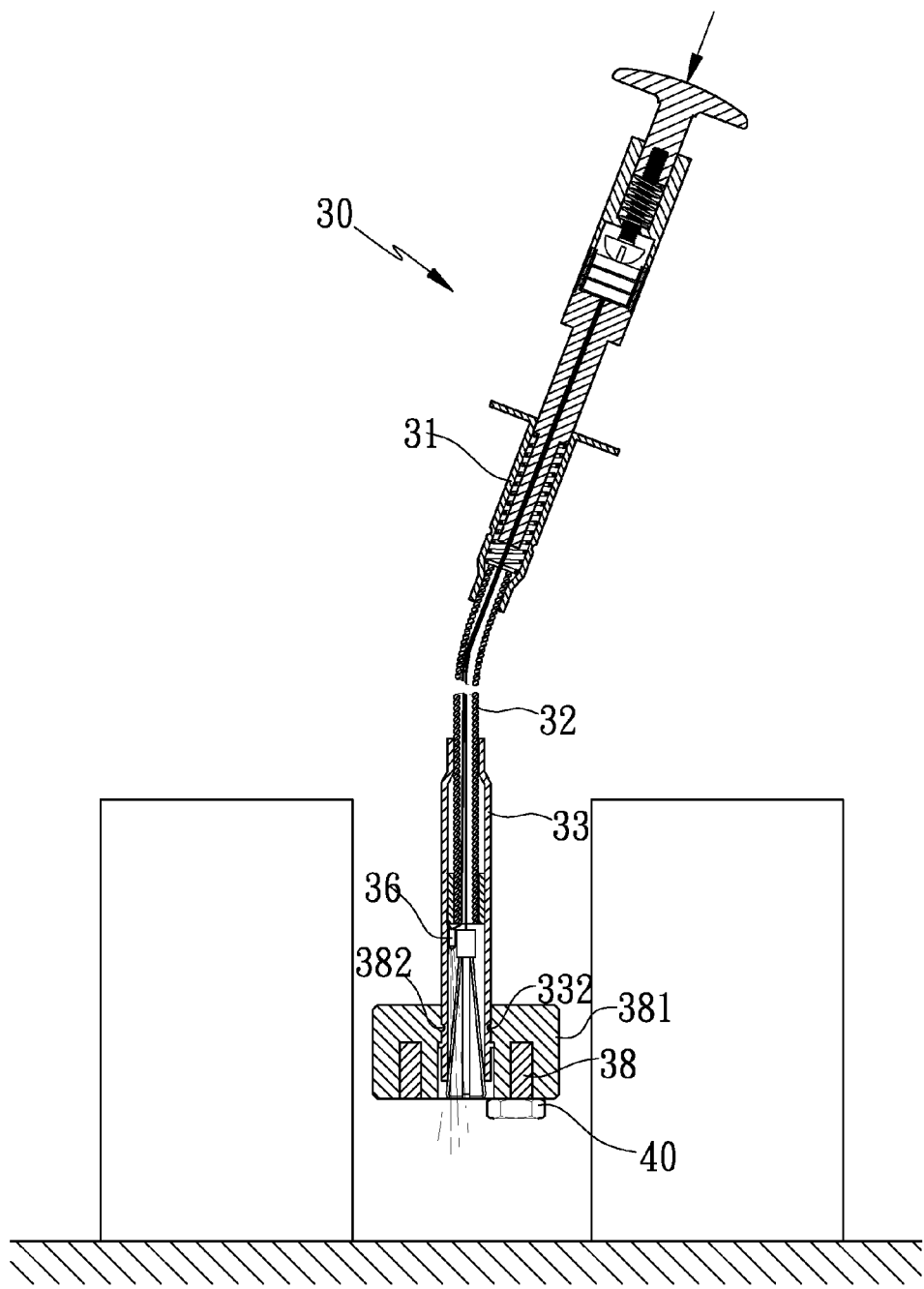
FIG. 10 is a cross sectional view showing the pick up tool of the present invention magnetically attracts the object.

Referring to FIG. 9, when picking up the object 40 in a narrow and dim space, the stem 375 of the controlling assembly 37 is pressed to compress the second resilient member 374 and to push the electricity conducting shaft 377 to move forward so that the abutting portion 378 of the electricity conducting shaft 377 contacts with the second electrode of the cell set 35. Due to the first electrode of the cell set 35 is coupled with the first leg of the bulb 36 by means of a conductive wire 361, and the second electrode of the cell set 35 conducts with the second leg of the bulb 36 via the electricity conducting the shaft 377, the stem 375, the receiving cylinder 371, the holder 345, the actuating post 34, the first tube member 31, the extending tube 32 and the second tube member 33, thus conducting a circuit to turn on the bulb 36 so that the object 40 is seen clearly. Thereafter, as shown in FIG. 10, the second tube member 33 is inserted into the narrow space, and the magnet loop 383 of the insulation sleeve 381 of the magnetic attracting member 38 on the second tube member 33 is used to attract the object 40 magnetically.

Figure 11:
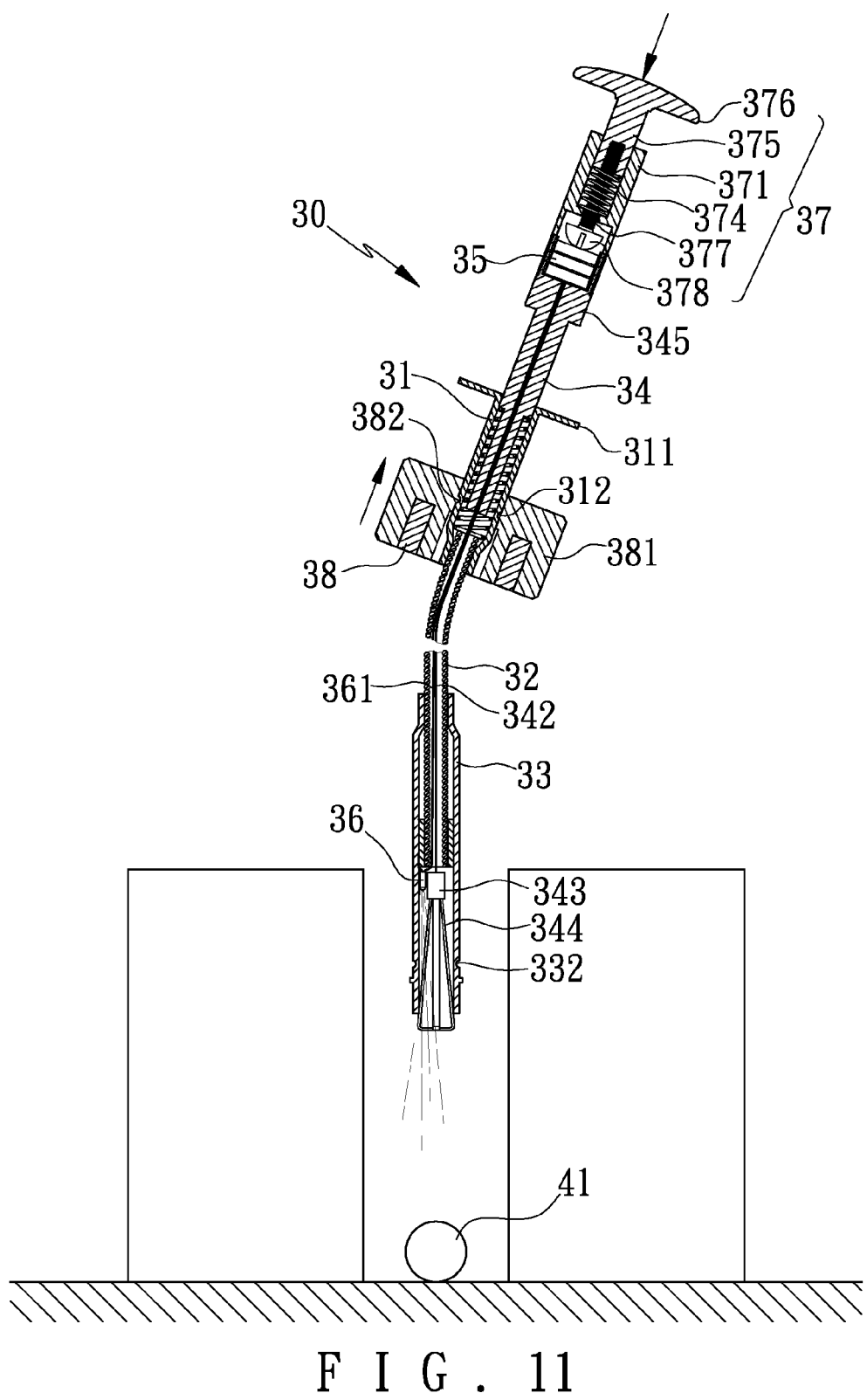
FIG. 11 is a cross sectional view showing a paw of the pick up tool of the present invention is used to pick the object.
Figure 12:
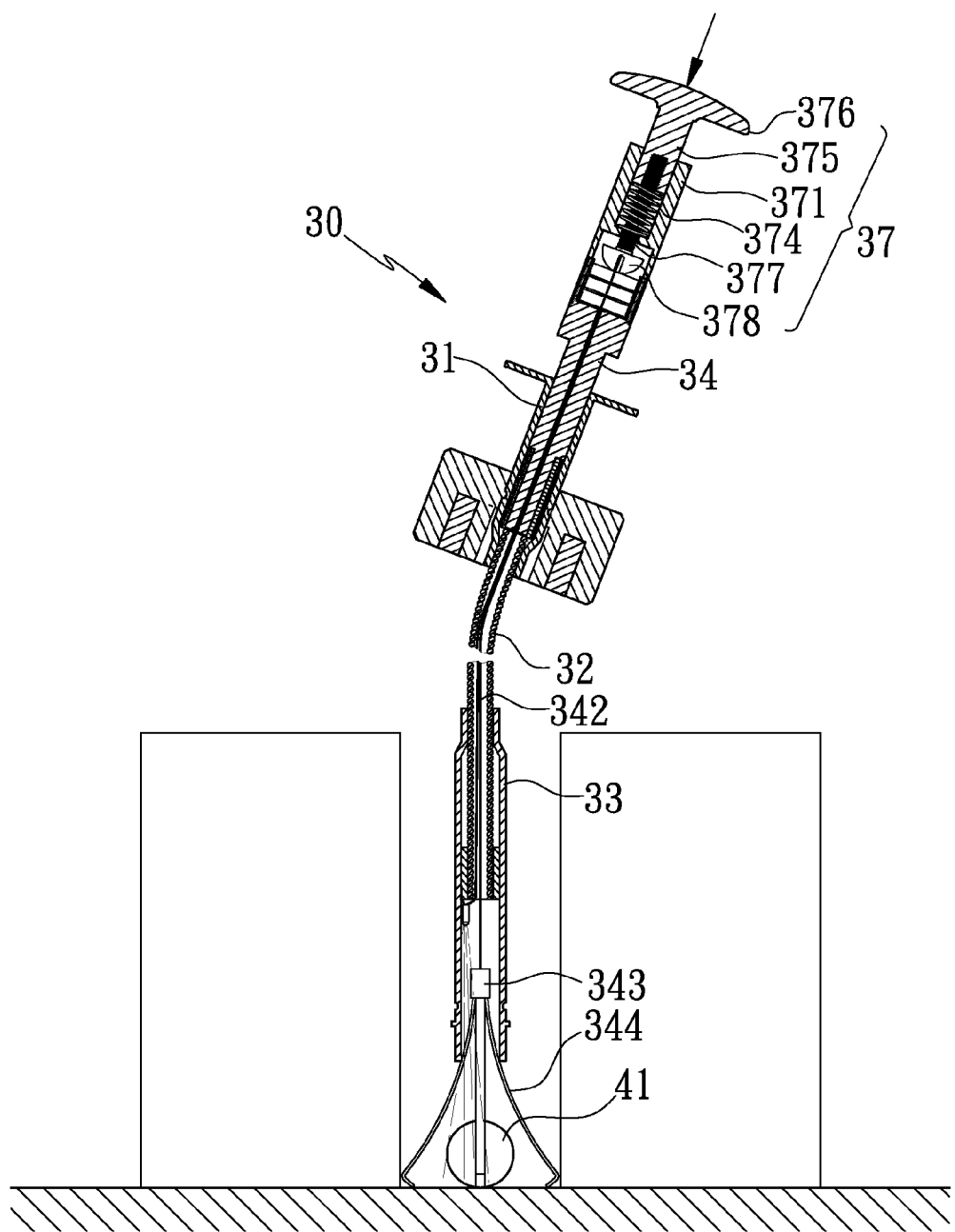
FIG. 12 is another cross sectional view showing the paw of the pick up tool of the present invention is applied to pick the object.

Referring to FIG. 11, when picking up another object 41 in a narrower and dimmer space, because the magnetic attracting member 38 is stopped by some articles in that space, the second tube member 33 can not be inserted into the space. In the meantime, the magnetic attracting member 38 is moved backward so that the insulation sleeve 381 of the magnetic attracting member 38 is fixed on the first tube member 31, and then the stem 375 of the controlling assembly 37 is pressed to turn on the bulb 36 so that the object 41 is seen clearly without being shielded. As illustrated in FIG. 12, the second tube member 33 is further inserted into the space, and the stem 375 is pressed continuously so that the stem 375 actuates the actuating post 34 to compress the first resilient element 341 to move forward. The stem 375 also actuates the string 342 and the par 344 to move frontward so that the paw 344 extends out of the second tube member 33 to become expandable and to pick up the object 40.

The invention is not limited to the above embodiment but various modifications thereof may be made. It will be understood by those skilled in the art that various changes in form and detail may made without departing from the scope and spirit of the present invention.

What is claimed is:

1. An easy operated pick up tool comprising:
    a body having a first tube member, an extending tube, and a second tube member, wherein a front end of said first tube member being connected with said extending tube, and a front end of said extending tube being coupled with said second tube member;
    an actuating post fitted into the rear end of said first tube member, between said actuating post and said first tube member being defined a first resilient element, wherein said actuating post including a holder arranged on a rear end thereof and a string secured on a front end thereof and inserted into said first tube member, said extending tube and said second tube member, wherein said string being inserted into a front end of the second tube member to connect with an expandable paw;
    a cell set received in said holder of said actuating post;
    a bulb disposed in said second tube member of said body and having a first leg connected with a first electrode of said cell set by ways of a conductive wire;
    a controlling assembly having a receiving cylinder screwed with a rear end of said holder to receive a stem, wherein said stem being actuated to push an electricity conducting shaft which contacts with a second electrode of said cell set so that said second electrode of said cell set contacts with a second leg of the bulb; and
    a magnetic attracting member having an insulation sleeve fitted on said body and moving frontward and backward along said body, wherein said insulation sleeve further comprises a magnet loop fixed on a front end thereof.

2. The easy operated pick up tool, as recited in claim 1, wherein said first tube member of said body includes a disc disposed on a rear end thereof.

3. The easy operated pick up tool, as recited in claim 1, wherein said extending tube is flexible.

4. The easy operated pick up tool, as recited in claim 1, wherein said second tube member of said body includes a stop rib formed on an outer surface thereof to limit the magnetic attracting member.

5. The easy operated pick up tool, as recited in claim 1, wherein said string is further inserted into a front end of said second tube member to connect with said paw by using a limiting ring.

6. The easy operated pick up tool, as recited in claim 1, wherein said second leg of said bulb contacts with an inner surface of said second tube member so that when said electricity conducting shaft is pushed to contact with said second electrode of said cell set, a circuit is conducted to said second leg of said bulb via said electricity conducting shaft, said stem, said receiving cylinder, said holder, said actuating post, said first tube member, said extending tube and said second tube member.

7. The easy operated pick up tool, as recited in claim 1, wherein said receiving cylinder of said controlling assembly includes a shoulder with a hole arranged therein, wherein said shoulder includes a second resilient member, a stem and a circular tab both of which are connected together, said shoulder also having said electricity conducting shaft attached on a front end thereof, and said electricity conducting shaft includes an abutting portion secured on a front end thereof and a rear end inserted into said hole of said shoulder to screw with said stem.

8. The easy operated pick up tool, as recited in claim 1, wherein said insulation sleeve of said magnetic attracting member includes a groove formed on the front end thereof to receive said magnet loop.

9. The easy operated pick up tool, as recited in claim 1, wherein among said insulation sleeve, said first tube member, and said second tube member is defined a positioning structure so that said magnetic attracting member is movably fixed on said first tube member, such that said paw is capable of picking up an object, and said magnetic attracting member is movably fixed on said second tube member so that said magnet loop attracts the object.

10. The easy operated pick up tool, as recited in claim 9, wherein said positioning structure includes a locking block disposed on an inner surface of said magnet member, a first slot fixed around an outer surface of said first tube member to retain with said locking block of said magnetic attracting member, a second slot formed around the outer surface of said second tube member to retain with said locking block so that said magnetic member is moved to be positioned on said first tube member or said second tube member.

* * * * *